United States Patent [19]

Takahashi et al.

[11] Patent Number: 5,126,102
[45] Date of Patent: Jun. 30, 1992

[54] FABRICATING METHOD OF COMPOSITE MATERIAL

[75] Inventors: Masashi Takahashi; Yoshiyasu Itoh, both of Yokohama, Japan

[73] Assignee: Kabushiki Kaisha Toshiba, Kawasaki, Japan

[21] Appl. No.: 668,191

[22] Filed: Mar. 12, 1991

[30] Foreign Application Priority Data

Mar. 15, 1990 [JP] Japan ................................ 2-65197

[51] Int. Cl.$^5$ ................................................ B22F 3/26
[52] U.S. Cl. ............................................ 419/2; 419/27; 419/49; 419/28; 428/547; 428/550; 428/610
[58] Field of Search .................... 428/547, 610, 550; 419/49, 27, 2, 28

[56] References Cited

U.S. PATENT DOCUMENTS

| | | | |
|---|---|---|---|
| 3,721,550 | 3/1973 | Schreiner et al. | 75/208 R |
| 4,081,272 | 3/1978 | Adlerborn | 419/49 |
| 4,803,046 | 2/1989 | Haussett et al. | 419/27 |
| 5,030,518 | 7/1991 | Keller | 428/547 |

OTHER PUBLICATIONS

"Design and Manufacture of Dis-Shaped Gradient Material"/The Third Symposium Concerning Gradient Materials, p. 49; Ryo Kawasaki et al.; Sep. 1989.
"Status of Fusion Reactor Development"/The Journal Published by the Welding Association of Japan, 56-3, p. 162; Yasuo Shimomura.
"Development of W/CU Gradient Composite Material by Sintering and Infiltrating Method (First Report)"-/Collection of Summaries from Seminar Conducted by the Japan Metallurgical Association, the Spring Convention, 1990, p. 300; Masashi Takahashi et al.
"Development of W/Cu Gradient Composite Material by Sintering and Infiltration Method (Second Report)"-/Collection of Summaries from Seminar Conducted by the Japan Metallurgical Association, the Autumn Convention, 1990, p. 552; Masashi Takahashi et al.
"Fabrication and Evaluation of W/Cu Gradient Material by Sintering and Infiltration Technique"/The First International Symposium FGM, p. 129; Masashi Takahashi et al.
"Development of W/Cu Composite with Gradient Structure"/The 10th HIP Seminar, p. 14; Yoshiyasu Itoh et al.

Primary Examiner—Stephen J. Lechert, Jr.
Attorney, Agent, or Firm—Oblon, Spivak, McClelland, Maier & Neustadt

[57] ABSTRACT

The present invention is directed to a method of preparing a composite material excellent in joint strength and heat conductivity, and more specifically to a method of preparing a composite material composed of a high-melting material W and low-melting material Cu. The method comprising a first step of forming pores in the high-melting material W, to obtain a substrate material having a porosity distribution, with a high porosity at at least one region of the surface of the substrate material and the porosity gradually decreasing outward from the region; and a second step of impregnating the low melting material Cu to the substrate material obtained in the first step from the region of the highest porosity gradually downward. The substrate material being formed to have a gradient distribution of a composite ratio of the high-melting material and the low-melting material.

10 Claims, 14 Drawing Sheets

| MATERIAL | CHEMICAL STABILITY | MELTING POINT (K) | THERMAL CONDUCTIVITY (W/m,K) |
|---|---|---|---|
| $TaB_2$ | STABLE | 3370 | 40 |
| $TiB_2$ | STABLE | 3190 | 38 |
| $HfB_2$ | STABLE | 3520 | 85 |
| $Y_2O_3$ | STABLE | 2713 | 3 |
| $ZrO_2$ | STABLE | 2950 | 2 |

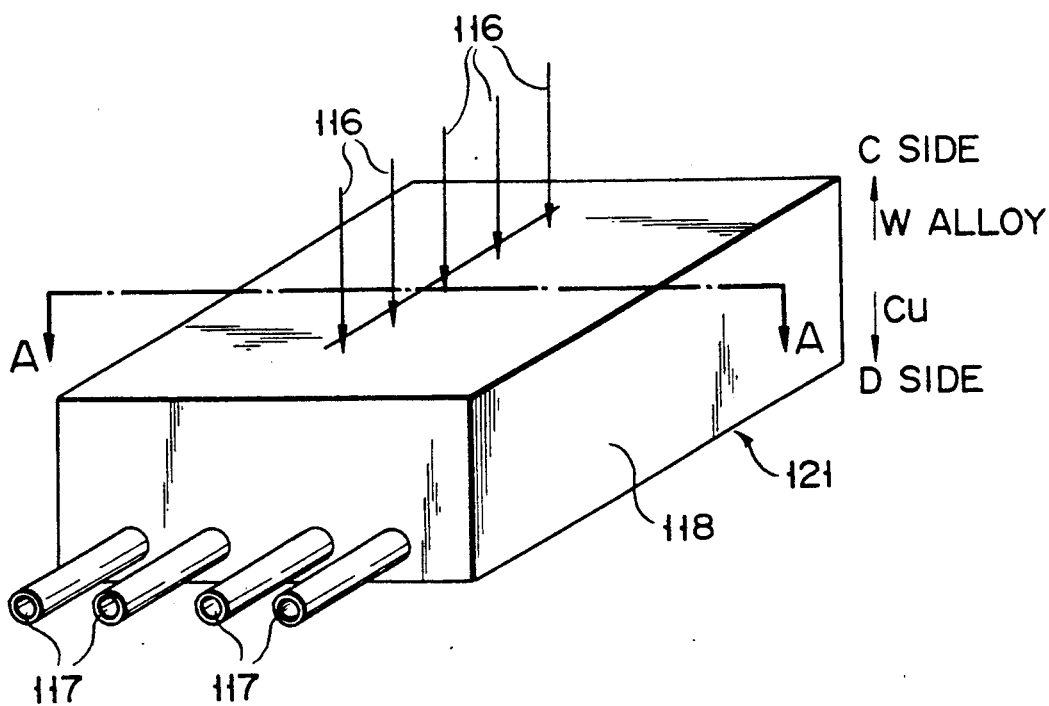
F I G. 11A
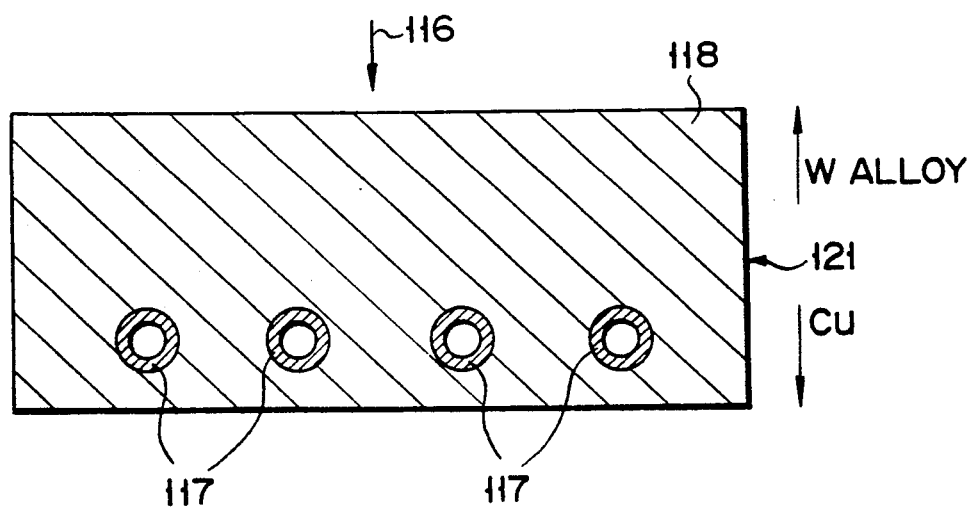
F I G. 11B

TEMPERATURE DISTRIBUTION

TEMPERATURE DISTRIBUTION OF BRAZING MATERIAL

THERMAL STRESS DISTRIBUTION

THERMAL STRESS DISTRIBUTION OF BRAZING MATERIAL

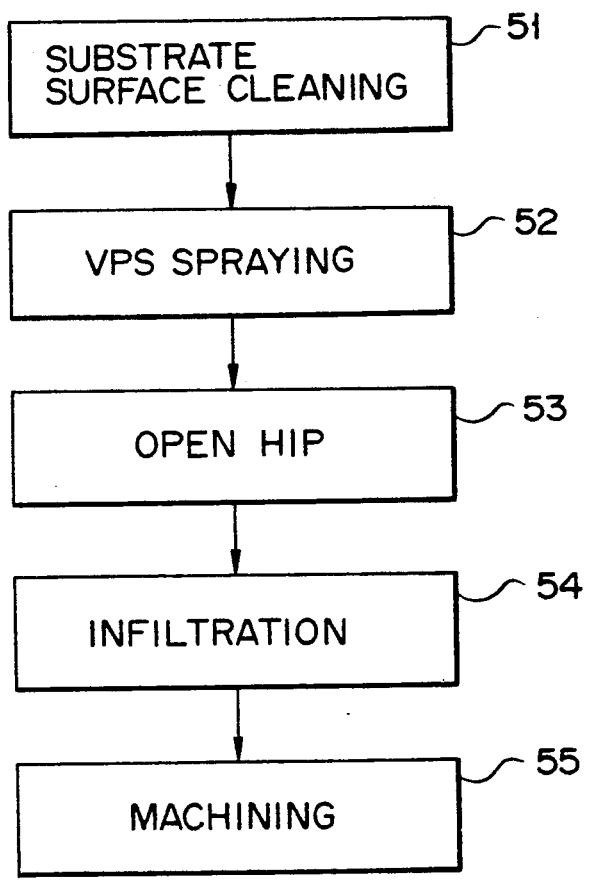
F I G. 17

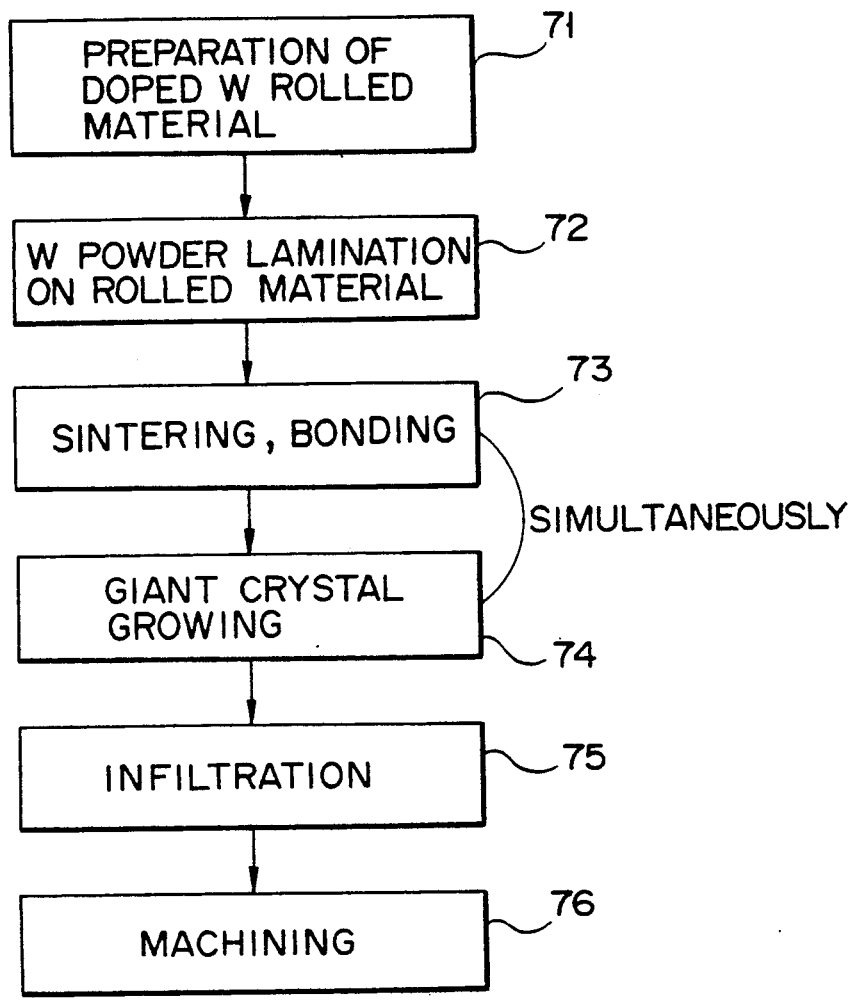
F I G. 19
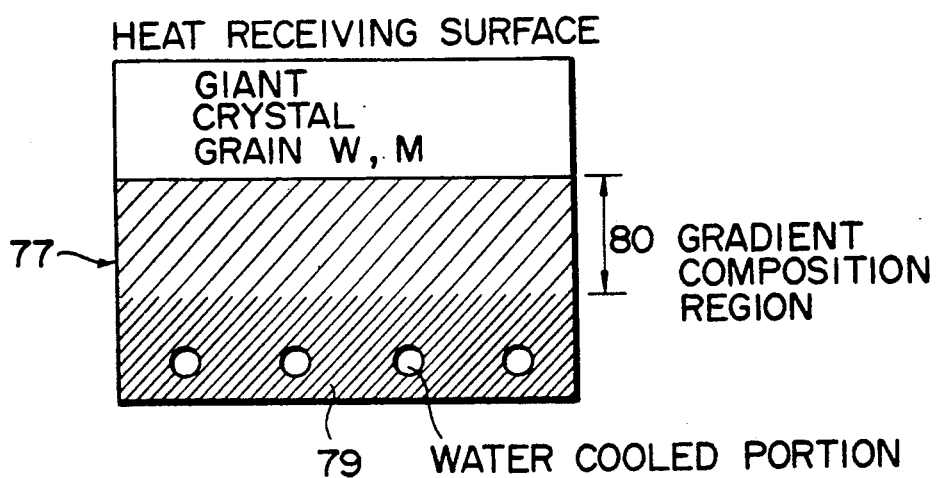
F I G. 20

FABRICATING METHOD OF COMPOSITE MATERIAL

BACKGROUND OF THE INVENTION

1. Field of the Invention

The present invention relates to a fabricating method of a composite material for compounding two materials differing in melting point and not mixing with each other in solid solution, such as W (tungsten) and Cu (copper), and a heat conductive material and fabricating method of heat conductive material.

2. Description of the Related Art

In the equipment possessing ultrahot molten metal field as represented by active metal melting crucible and heat receiving plate, it is often indispensable to use a material withstanding electron beam or plasma having high temperature and high energy density, that is, the beam target material.

Since the beam target material is used in rugged condition, it is required to satisfy the following two characteristics: (1) sufficient resistance to heat directly beneath heat source rising in temperature, (2) excellent heat conductivity and cooling characteristic. The second point is needed because the opposite side of the heat source is generally cooled by some means.

In a single material, however, the heat resistance and heat conductivity cannot be considered separately, and when either one is determined, the other is automatically determined, of course, within a limited range. Accordingly, hitherto, in order to enhance the both characteristics together, it is attempted to composite materials. One of such attempts is to fabricate a composite material excellent in both heat resistance and heat conductivity, by combining W which is high in melting point among metals and Cu which is excellent in heat conductivity.

When compounding W and Cu, however, since they are not mixed with each other in solid solution, the bonding method is limited, and simple gluing or brazing or other mechanical bonding methods are mainly employed.

If such compound of W and Cu is used in high temperature field, the difference in thermal expansion between the two is very large. Specifically, W has thermal expansion factor of $4.5 \times 10^6/K$, while Cu has that of $17.1 \times 10^6/K$, and the generated thermal stress is extremely large. Accordingly, when W and Cu are merely brazed and compounded, cracks are likely to be formed in W which has the smaller thermal expansion factor, due to tensile stress when heating, as well as peeling due to thermal stress caused in the interface of W and Cu. Such cracking and peeling will lower the total thermal conductivity, which may lead to temperature rise of materials, or meltdown accident in worst cases.

It is therefore attempted to obtain gradient materials with structure control (hereafter referred to as "gradient material" recently by mixing two powders, laminating by varying their mixing ration, and sintering the laminates.

This technique is capable of obtaining gradient materials if the melting points of two powders to be mixed are similar to each other, but when extremely different, only one material is molten while the other is not, and it is difficult to fabricate a gradient material with structure control.

SUMMARY OF THE INVENTION

It is hence a primary object of the invention to present a fabricating method of a composite material excellent in thermal conductivity and bonding strength at the interface of two materials to be bonded together, a heat conductive material, and a fabricating method of a heat conductive material.

According to the invention there is provided a fabricating method of composite material compounding a high melting material and low melting material comprising: a first step of forming pores in the high melting material to obtain a material having a porosity distribution, with the porosity large at least in a part of the surface and gradually increasing in the porosity toward that part, and a second step of infiltrating the low melting material from the large porosity part of the material obtained in the first embodiment, wherein the composition ratio of the high melting material and low melting material is in a gradient distribution.

According to the invention, since the composition changes continuously in the gradient composition region (interface) of high melting material and low melting material, that is, the composition is sloped, the bonding strength (adhesion) of the interface of two materials and thermal conductivity are superior.

Besides, when the position with a large generation of thermal stress is made of the high strength material, it is possible to withstand more rugged conditions, such as high thermal load condition in the case of beam target, for example.

In addition, since the sintering process is varied by using thermal spraying, a gradient composition is made of a three-dimensional surface such as a cylinder.

According to the second invention, grain boundary likely to cause grain boundary brittleness can be eliminated, so that the heat conductive material can withstand both stationary and nonstationary thermal loads.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11A shows a perspective view of an electron beam target including the material obtained in the third embodiment;

FIG. 11B shows a sectional view of the electron beam target along an A—A line;

FIG. 17 is a process chart showing a sixth embodiment of fabricating method of composite material of the invention;

FIG. 19 is a process chart showing an eighth embodiment of fabricating method of composite material of the invention; and FIG. 20 is an approximate sectional view of the material obtained in the eighth embodiment.

DETAILED DESCRIPTION OF THE PREFERRED EMBODIMENTS

Figure 1:
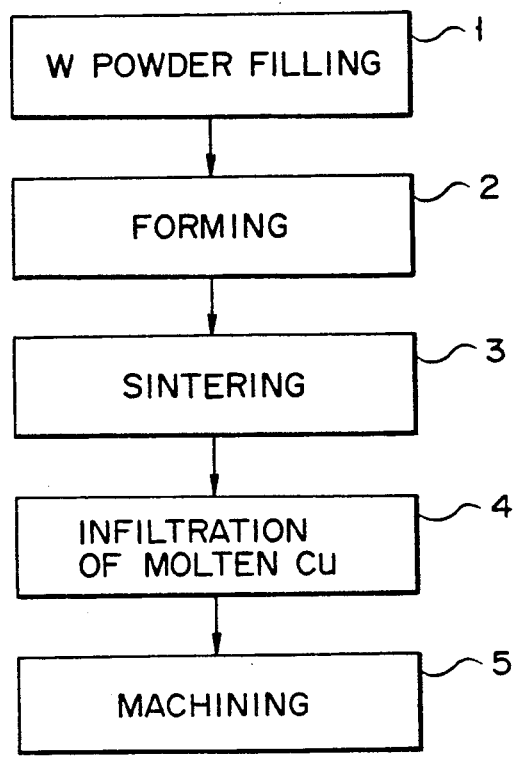
FIG. 1 is a process chart showing a first embodiment of fabricating method of a composite material of the invention.

Referring now to the drawings, some of the preferred embodiments of the invention are described in detail below. FIG. 1 is a process chart for explaining the first embodiment of the fabricating method of composite material of the invention. At step 1, in order to form W powder in a specified shape, it is charged into a pattern (now shown). At step 2, the W powder obtained at step 1 is formed. At step 3, the form obtained at step 2 is sintered to form pores, and a sintered W body increased in the porosity toward the infiltrating side (the side where the infiltrated material becomes 100% as a result of infiltration) is obtained. At step 4, Cu is melted in a container (not shown), and it is infiltrated in the pores of the sintered W body obtained at step 3. At step 5, the material obtained at step 4 is machined and a finally desired product shape is obtained.

From the thus obtained composite metallic material, the following effects are obtained.

Figure 2A:
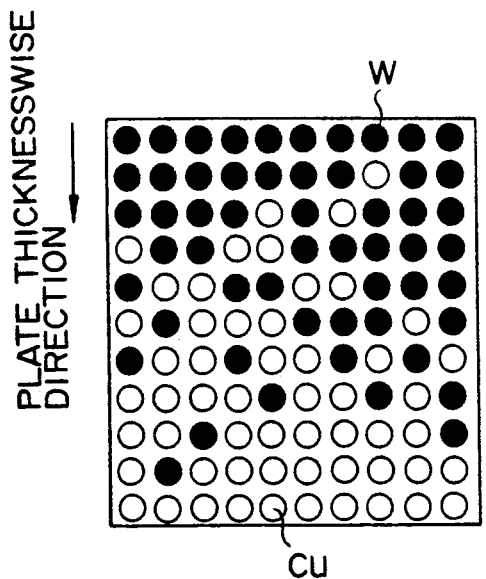
FIGS. 2A and 2B show a schematic diagram of a composite metallic material gradient in composition at the interface of W and Cu of FIG. 1.
Figure 2B:
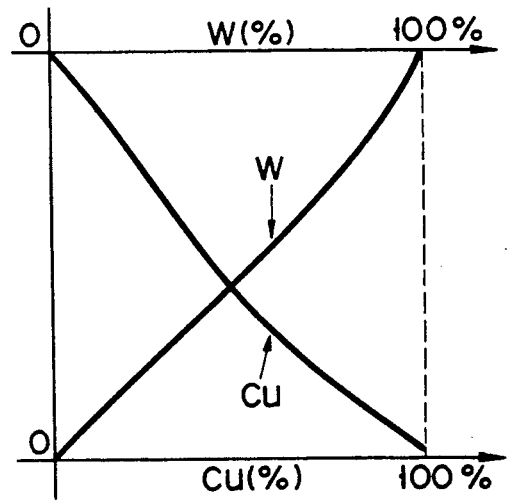

1) The composition at the interface of W and Cu varies almost continuously, that is, the composition becomes gradient. FIG. 2 is a schematic diagram of a compound metal material fabricated as described above, in which FIG. 2A is a composition distribution diagram and FIG. 2B is a distribution characteristic diagram relating to the ratio by weight of W and Cu. As evident from this diagram, since the composition is sloped in the gradient composition region of W and Cu, the composite metal material of the invention is, as compared with the conventional composite metal material making use of mechanical bonding such as gluing and thermal spraying of simple materials, increased in the contact area of W and Cu because a microscope network structure is formed between W and Cu, so that the contact is notably enhanced.

Figure 3:
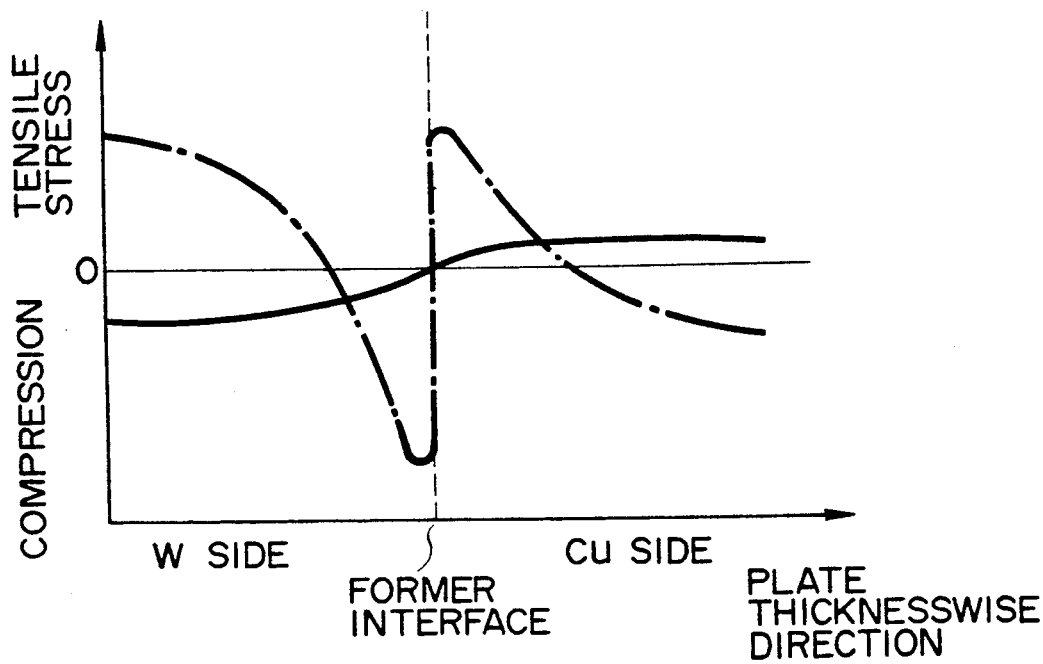
FIG. 3 is a schematic diagram of stress generated on the interface of W and Cu of FIG. 1.

2) In the embodiment, the coefficient of thermal expansion stress in the mixed layer of W and Cu changes almost in proportion to the mixing ratio. The thermal stress of the layer (i.e., a combination of compression stress and tensile stress) is relatively small and gently changes as is indicated by the solid curve shown in FIG. 3. By contrast, the thermal stress of the composite layer made by the conventional mechanical bonding method is great and changes much as is evident from the dot-dash line shown in FIG. 3.

Figure 4:
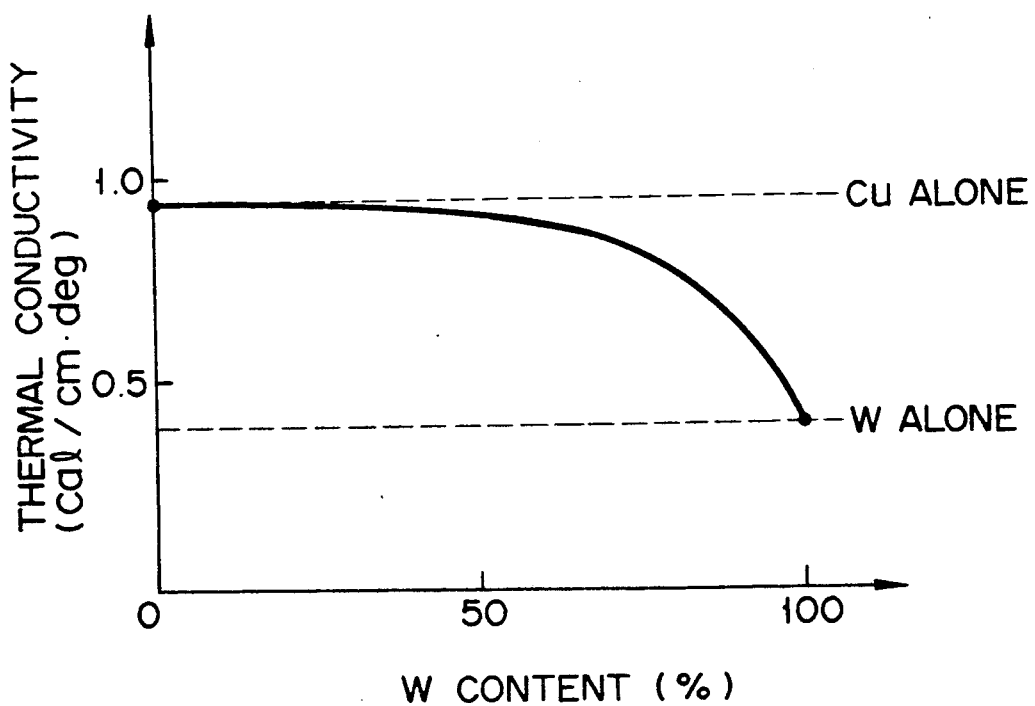
FIG. 4 is a diagram showing the thermal conductivity in the mixed layer of W and Cu in the composition gradient part of FIG. 1.

3) The material of the embodiment can eliminate the gap between materials as seen in the simple gluing (the prior art), as the contact area of QW and Cu increases. Accordingly, the thermal resistance is reduced at the interface of the gradient composition of W and Cu, and an excellent thermal conductivity as in W alone or Cu along may be obtained. FIG. 4 is a characteristic diagram of thermal conductivity to ex plain this, and as evident from this diagram, it is possible to obtain an excellent thermal conductivity on the whole, exceeding that of the W alone, by making use of the characteristic that the thermal conductivity of the portion gradient in composition depends greatly on Cu which is greater in the conductivity.

Figure 5A:
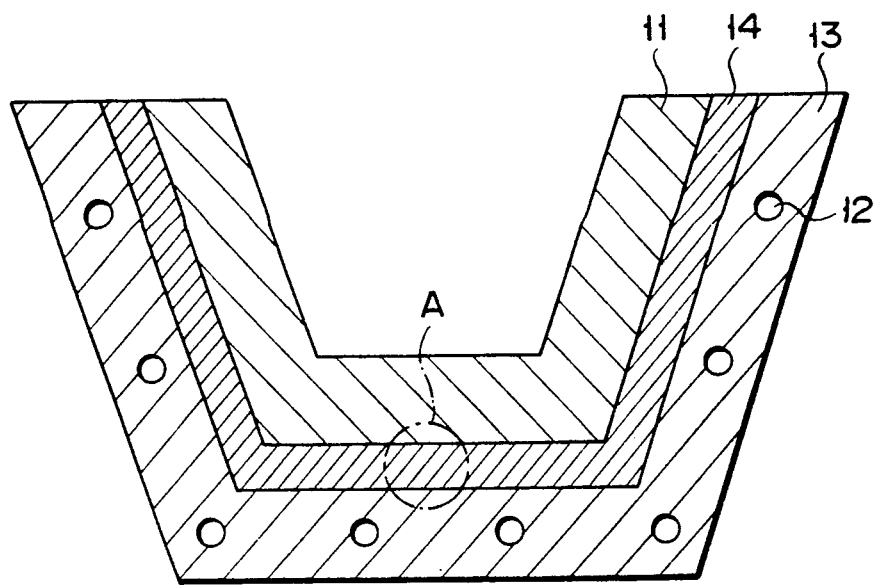
FIGS. 5A and 5B show, respectively, a sectional view of an active metal melting crucible and a diagram schematically showing the fine texture of part A of the material obtained in the embodiment of FIG. 1.
Figure 5B:
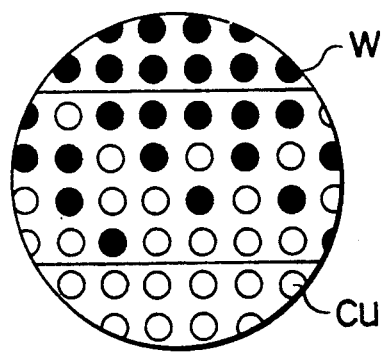

Referring now to FIG. 5, an example of applying the composite material obtained in the first embodiment into a crucible for melting active metal or heat receiving plate is explained below. FIG. 5A is a sectional view showing a crucible for melting active metal main body 11 and water-cooled hearth 13, and FIG. 5B is a schematic diagram of fine texture of part A of FIG. 5A. The crucible main body 11 side is exposed to high temperature and is hence made of high melting metal W, the water-cooled hearth 13 is made of Cu which is excellent in thermal conductivity, and the gradient composition region 14 of W and Cu is a so-called gradient composition varying continuously in composition. Numeral 12 is a water cooling hole.

Figure 6:
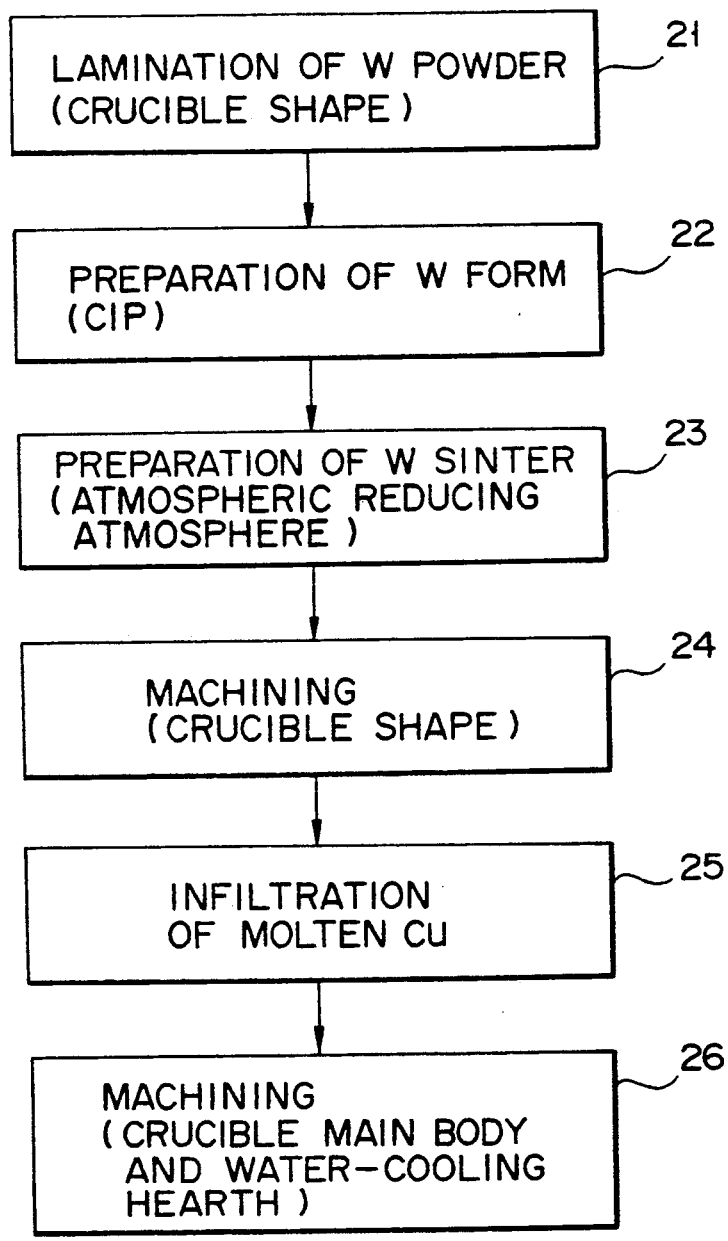
FIG. 6 is a process chart showing a second embodiment of fabricating method of a composite material of the invention.

To manufacture such a structure, the process is as shown in FIG. 6. That is, at the first step 21, W fine powder is prepared, and it is laminated in the shape of the crucible main body 11 in FIG. 5. At the second step 22, the laminate obtained in the first step 21 is formed, for example, by CIP (cold isostatic pressing) to produce a W form. At the third step 23, the W form obtained in the second step 22 is held in $H_2$ or other reducing high-temperature atmosphere for about several hours to produce a W sinter. At the fourth process 24, the sintered W body obtained in the third step 23 is machined to finally finish into a crucible shape. In this case, it is machined including the gradient portion of the interface.

In the first to fourth processes 21 to 24, the density becomes 95% or more at the inside of the crucible main body 11. Besides, the manufacturing conditions such as material powder, forming pressure, sintering temperature and others are controlled so that the density may change continuously to about 50% at the outside of the crucible main body 11.

At the fifth step 25, Cu is melted by some means, and the sintered W obtained in the third process 23 is infiltrated into this molten bath of W, and after holding until the molten Cu is sufficient penetrating into the pores of the sintered W, it is cooled. The fifth process 25 is conducted in reducing high temperature atmosphere of $H_2$ or the like, and in the sixth process 26, after sufficiently cooling, it is taken out into the atmosphere, and is machined to the specified dimensions of the crucible main body 11 and water-cooled hearth 13.

The crucible made of such composite metal material manufactured in such fabricating method (FIG. 5) is wide in the contact area of the gradient composition region 14 with W and Cu, and hence the adhesion and thermal conductivity are excellent. Moreover, since the composition of the gradient composition region 14 is gradient, it is effective to reduce the peak value of the thermal stress caused when heating due to the difference in the coefficient of thermal expansion between W and Cu.

Figure 7:
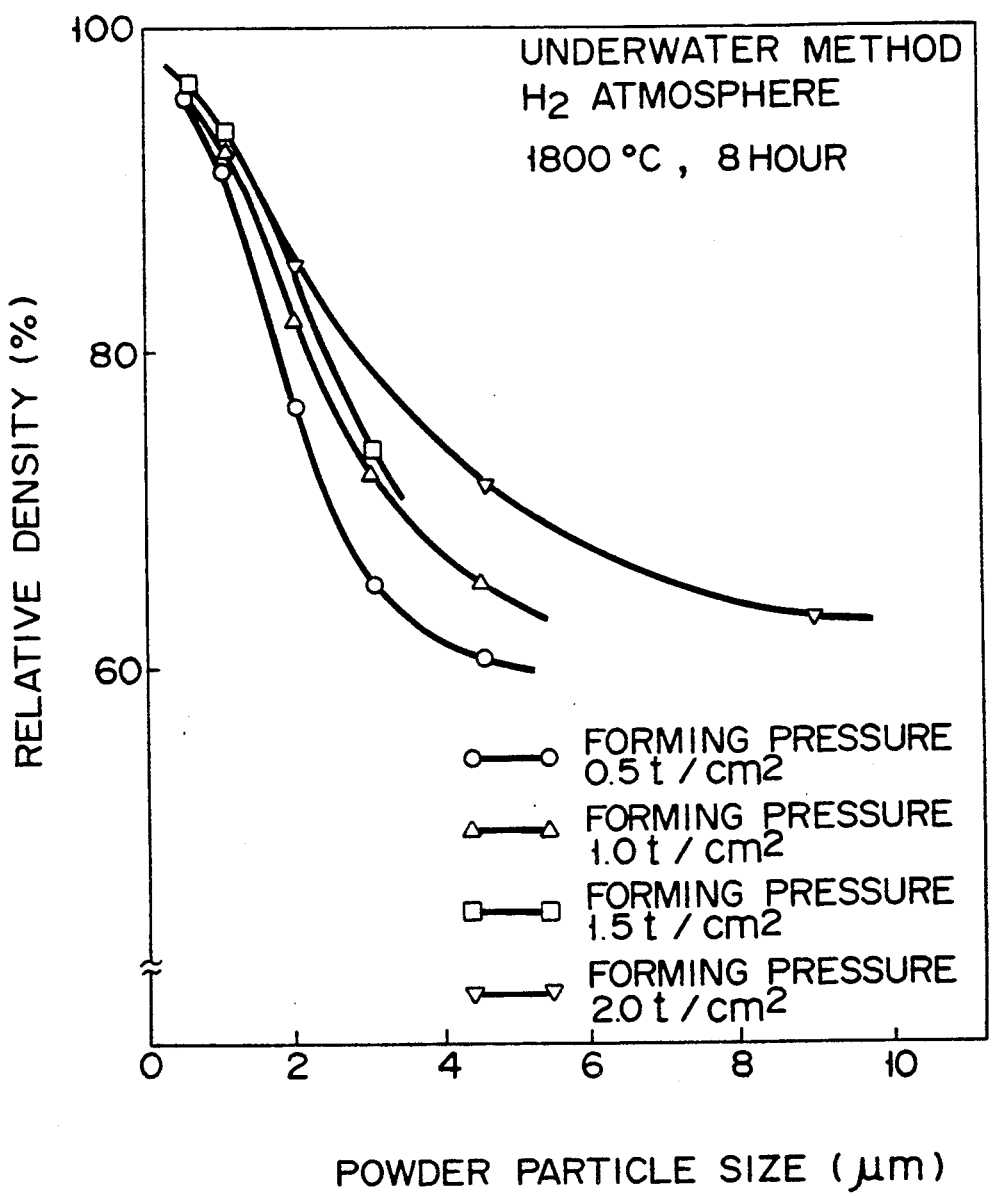
FIG. 7 is a diagram for explaining the effect of particle size of W powder or forming pressure on the relative density of the sintered body in the second embodiment.

On the other hand, the crucible of the embodiment is characteristic in that a sintered W crucible continuously varying in the porosity at the outside of the crucible main body 11 is fabricated. As for the effect of the material powder on the density of sintered body as shown in FIG. 7, by varying the powder particle size within a range of 1 $\mu$m to 10 $\mu$m, it is possible to fabricate a W sinter possessing the relative density of 60% to 95%. By making use of this property, by continuously varying the particle size of the W powder used in lamination of W powder, the sintered W crucible varying continuously in density from 95% to 60% can be manufactured. Meanwhile, although the effect is not so great as to change the powder particle size, it is also a method to vary the forming pressure and sintering temperature for changing the density of the sinter, and by combining them, it is possible to fabricate the sintered W crucible main body 11 more effectively. Besides, in impregnation of sintered W crucible main body 11 into molten Cu, since the molten Cu is very likely on a solid W to wet, and it penetrates into the closed pores in the sintered W body. Since the boundary of the closed pores and open pores of the sintered W body is about 90%, the majority is infiltrated into the low density area of the outside of the sintered W crucible main body 11. Therefore, since the density of the outside of the sintered W crucible main body 11 changes continuously, a crucible of gradient composition of W and Cu is completed in this way.

According to the second embodiment described so far, the interface composition of W and Cu is gradient, and the contact area of W and Cu is increased, so that the following effects are brought about.

a) The adhesion at the gradient composition region 14 is strengthened, and the thermal stress at the gradient composition region 14 during high-temperature use is alleviated, and hence cracks and peeling at the gradient composition region 14 are decreased, so that the life is extended.

b) The thermal resistance at the gradient composition region 14 is reduced and the total thermal conductivity is enhanced, so that the water-cooling effect of the water cooled hearth 13 may be sufficiently utilized. As a result, the temperature gradient of the molten metal in the crucible main body 11 is increased, and the internal wall temperature of the crucible main body 11 may be lowered, which also contributes to extension of the life.

The second embodiment relates to an active metal melting crucible or heat receiving plate, but it may be also applied in other high temperature devices that require the combination of W and Cu. In the embodiment, as the materials for compounding, the combination of W and Cu is presented, but it is not limitative, and it may be applied to any other two materials as far as they differ in melting point and are not mutually miscible in solid solution. Anyway, it is necessary to comprise a step of sintering the high melting material and a step of impregnation of the sintered body into the low melting molten material, and after these steps, a gradient material at the interface of the composite metal material is obtained.

The third and fourth embodiments of the fabricating method of the composite material of the invention are explained below while referring to FIGS. 8 to 10. In the first embodiment described above, since the change of the coefficient of thermal expansion at the interface of W and Cu is reduced, as compared with the conventional brazed material, the thermal stress can be alleviated significantly. However, in the first embodiment, the mechanical strength is not fully satisfactory because it requires a step of manufacturing a sintered W body having a porosity distribution in the plate thicknesswise direction, and a step of sintering and infiltrating of molten Cu into pores of the sintered W body. That is, since the W which is responsible for mechanical strength undergoes a step of sintering, the grain boundary is particularly weak in the recrystallized grains. Furthermore, since this sintered W body is required to have a porosity distribution in the plate thicknesswise direction, hot forging cannot be applied as the post-processing for enhancing the mechanical strength. Therefore, even if the thermal stress is alleviated by sloping the composition at the interface of W and Cu, since the mechanical strength is low, cracks may be formed in the W.

Accordingly, in the third embodiment, in order to enhance the mechanical strength of the first embodiment, in a combination of two materials of single composition such as W/Cu gradient material, by adding a second element which is miscible in solid solution, for example, powder of Re (rhenium), Ta (tantalum), Nb (niobium) or Hf (hafnium), the solid solution composition is sloped, so that only the mechanical strength is enhanced while holding the same functions.

Figure 8:
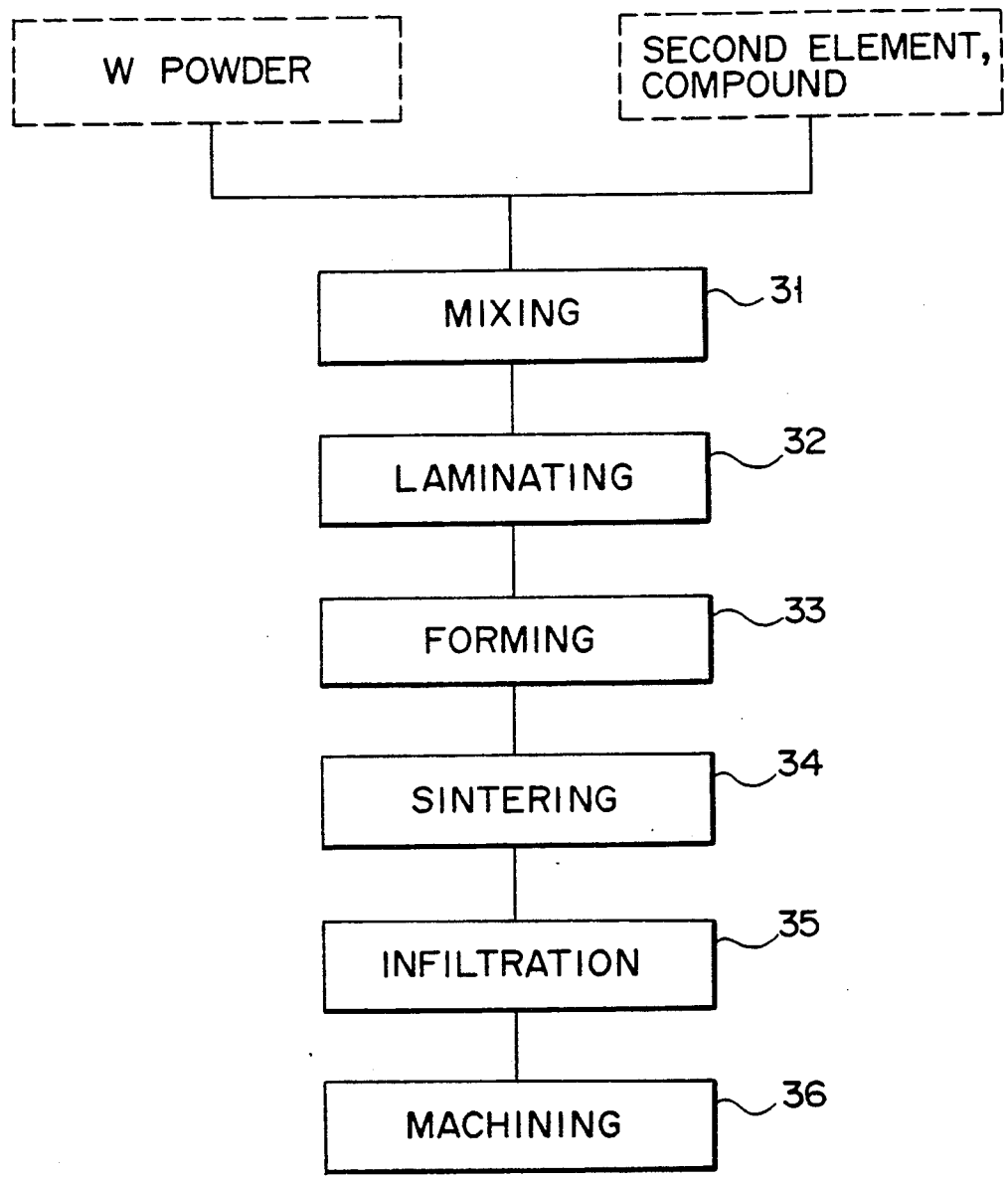
FIG. 8 is a process chart showing third and fourth embodiments of fabricating method of composite material of the invention.

More practically, as shown in the process chart in FIG. 8, at the first step 31, Re powder is added to the W powder differing in particle size. At the second step 32, powders are laminated sequentially from the smaller particle size. At the third step 33, the laminate laminated in the second step 32 is formed by die press forming or CIP forming method. At the fourth step 34, the form obtained in the third step 33 is sintered, and the solid-solution element is alloyed with W, thereby obtaining a W alloy sintered body having a porosity distribution in the plate thicknesswise direction (W-HIP material in FIG. 9). At the fifth step 35, the W alloy sintered body obtained in the fourth step 34 is impregnated in molten Cu and Cu is infiltrated in pores, and it is cooled. At the sixth step 36, the infiltrated material obtained in the fifth step 35 is machined and finished to a desired product shape.

The fourth embodiment is, similar to the third embodiment, a fabricating method of composite material enhanced only in the mechanical strength, while maintaining the functions, in which, in order to enhance the mechanical strength of the first embodiment, in a combination of two materials of single composition such as W/Cu gradient material, a second element or compound not miscible in solid solution, such as $ThO_2$ (thoria) powder is added, and the dispersion is intensified to slope the composition.

More practically, the fourth embodiment is the same as the third embodiment except that, as shown in the process chart in FIG. 8, $ThO_2$ powder is added to the W powder differing in particle size in the first step 31.

The materials obtained by the third and fourth embodiments feature the following points.

Figures 9, 10:
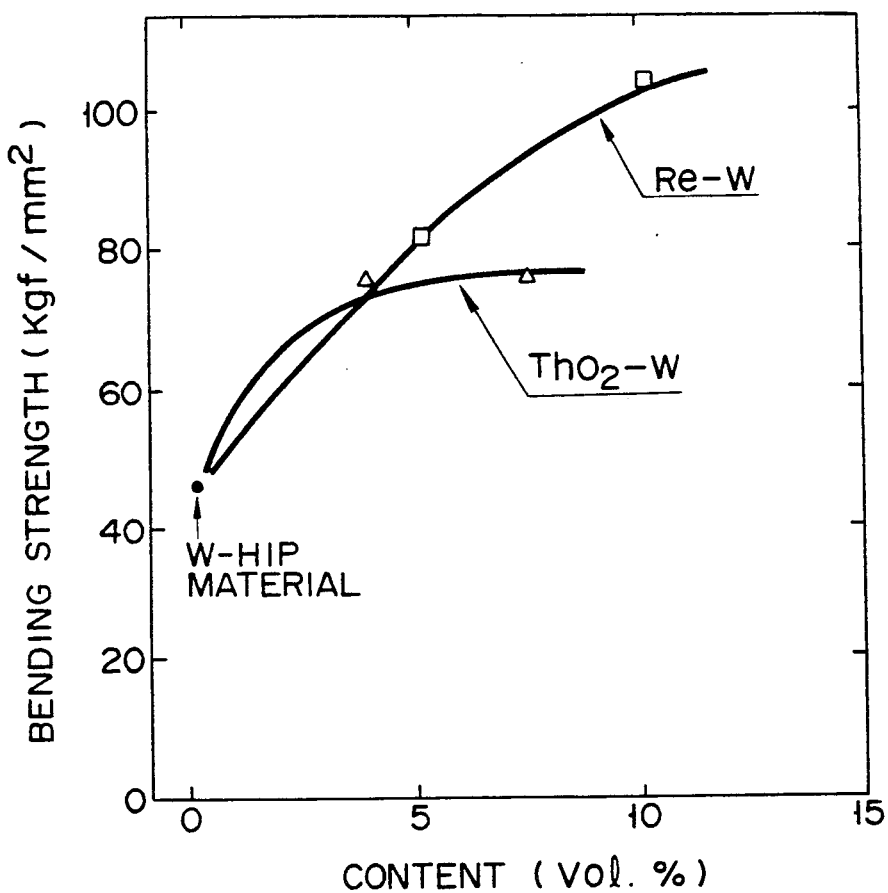
FIG. 9 is a diagram for explaining the mechanical strength of the material obtained from the third embodiment.
FIG. 10 is a diagram showing candidate examples of dispersion reinforcing material of the third embodiment and their principal properties.

1) The W which is responsible for the mechanical strength of the material is greatly enhanced in the bending strength by alloying as shown in FIG. 9.

2) Since the interface of the W alloy and Cu is gradient in composition, there is not an abrupt change in the coefficient of thermal expansion, and the thermal stress is alleviated as compared with the bond by the conventional brazing or other method.

3) Since the thermal conductivity of W alloy mainly depends on W which is superior in heat conduction, the thermal conductivity on the whole is hardly lowered although the thermal conductivity of $ThO_2$ is a low 10 W/m,k.

5) As evident from the process of the material obtained in the fourth embodiment, since the Cu with excellent thermal conduction is in network structure, the total thermal conduction is very good.

In the fourth embodiment, $ThO_2$ is used as the dispersion reinforcing agent, but basically any other material may be used as far as it is stable chemically and high in melting point, and any of the dispersion reinforcing agents shown in FIG. 10, that is, $TaB_2$, $TiB_2$, $HfB_2$, $Y_2O_3$, $ZrO_2$, may be used.

Hence, according to the third and fourth embodiments, peeling at the interface of W and Cu and cracks in material may be eliminated, and finally rise of material temperature and melting accident derived from the increase of thermal stress due to peeling or cracking may be eradicated.

An example of application of the material obtained in the third embodiment as electron beam target is explained below while referring to FIGS. 11 to 14. FIG. 11A, FIG. 11B relate to an example of application of the composite material obtained in the third embodiment in the beam target for active metal melting crucible or the like, in which FIG. 11A is a schematic diagram of a target for electron beam (EB), and FIG. 11B is a sectional view showing the section cut in the direction of the arrow along the line A—A in FIG. 11A. Since the C side of the beam target 121 is exposed to the EB 116 and high in temperature, it is made of W alloy of high melting point and high strength.

On the other hand, the D side on the opposite side of the beam target 121 is made of Cu which is excellent in thermal conductivity and mechanability, and it is cooled in water with water cooling pipe 117. Between the C side and D side, the composition ratio of W alloy and Cu changes continuously, that is, the so-called gradient composition is made.

Figure 12:
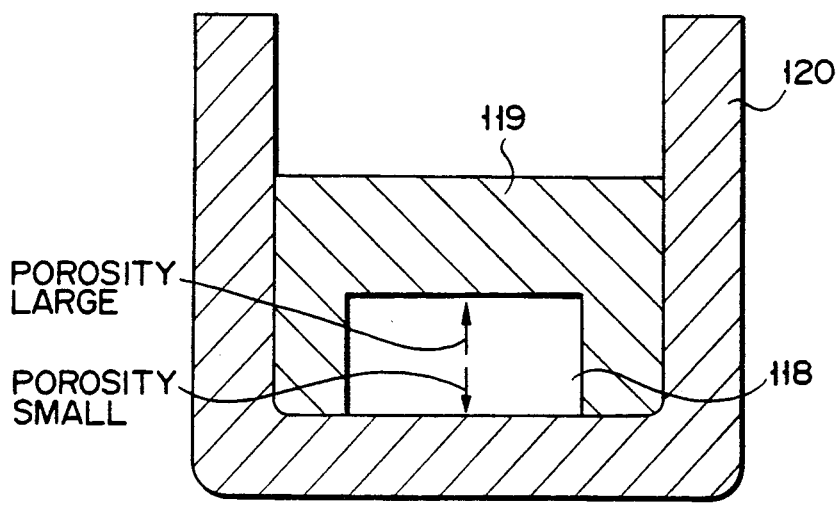
FIG. 12 is a diagram for explaining the infiltration method of Cu when fabricating the electron beam target material of FIG. 11.
Figure 13A:
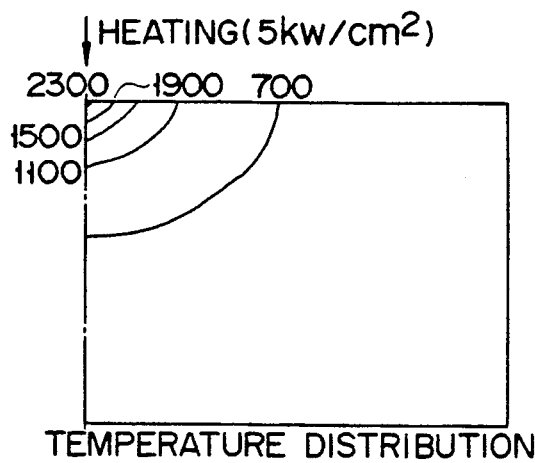
FIGS. 13A and 13D show, respectively, the results of analysis of temperature distribution and mechanical stress distribution when electron beam is emitted to the electron beam target in FIG. 11.
Figure 13C:
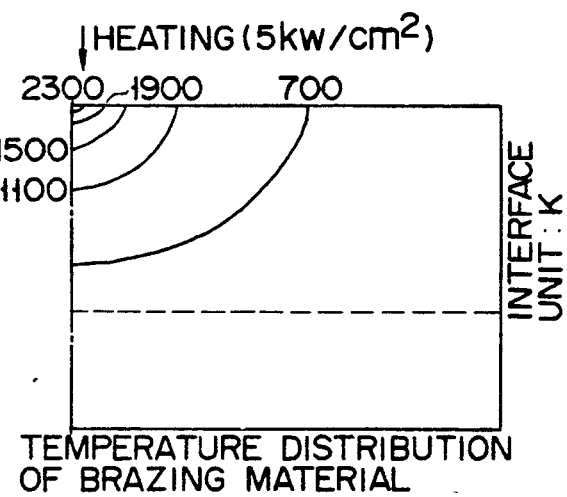
Figure 13B:
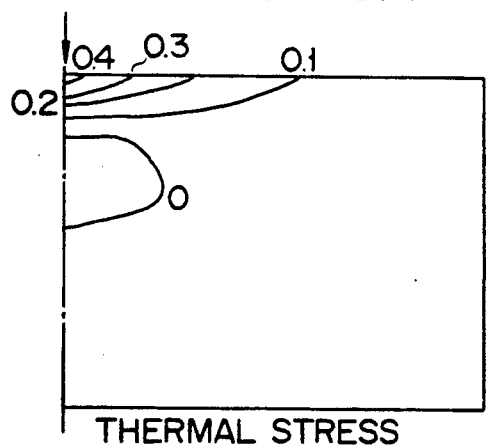
Figure 13D:
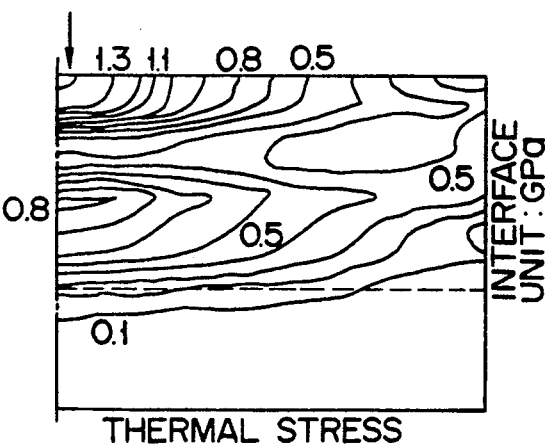

The composite material used in FIG. 11A, FIG. 11B is manufactured in the following procedure. In the first place, the W alloy sintered body 118 is fabricated same as shown in FIG. 8, from the first to the fourth steps. However, when infiltrating Cu 119 into pores of the W alloy sintered body 118, as shown in FIG. 12, in a slightly large graphite crucible 120, the low porosity side is set at the upper side, and the build-up part of Cu is disposed at the opposite side. In this state, after completion of infiltration of Cu, it is machined and finished to desired size, and a hole is drilled for the water cooling pipe 117. Finally, the water-cooling pipe 117 is brazed by using Ag-Cu solder or the like, thereby completing the beam target 121.

In the thus fabricated beam target 121, the W alloy and Cu are in gradient composition, and the Cu of excellent thermal conductivity is in network structure, and therefore the temperature reached during use may be lowered, and the thermal stress may be alleviated.

FIG. 13 shows the result of analysis of temperature distribution and thermal stress (principal stress) distribution when the electron beam target shown in FIG. 11 is exposed to electron beam. Specifically, FIG. 13A and FIG. 13C are to compare the result of analysis by finite element method of temperature distribution when heated by linear EB of 5 kW/cm$^2$ each, between the W alloy/Cu gradient material, and W alloy/Cu brazed material. FIG. 13B and FIG. 13D are to compare the thermal stress distribution when heated by linear EB of 5 kW/cm$^2$ each by the same finite element method, between the W alloy/Cu gradient material and W alloy/Cu brazed material. It is known from the result that the maximum reaching temperature may be lowered by about 80 K by composing gradient material. Besides immediately, beneath the EB where the temperature gradient is the greatest, the maximum thermal stress is known to be reduced to about ½.

Figure 14:
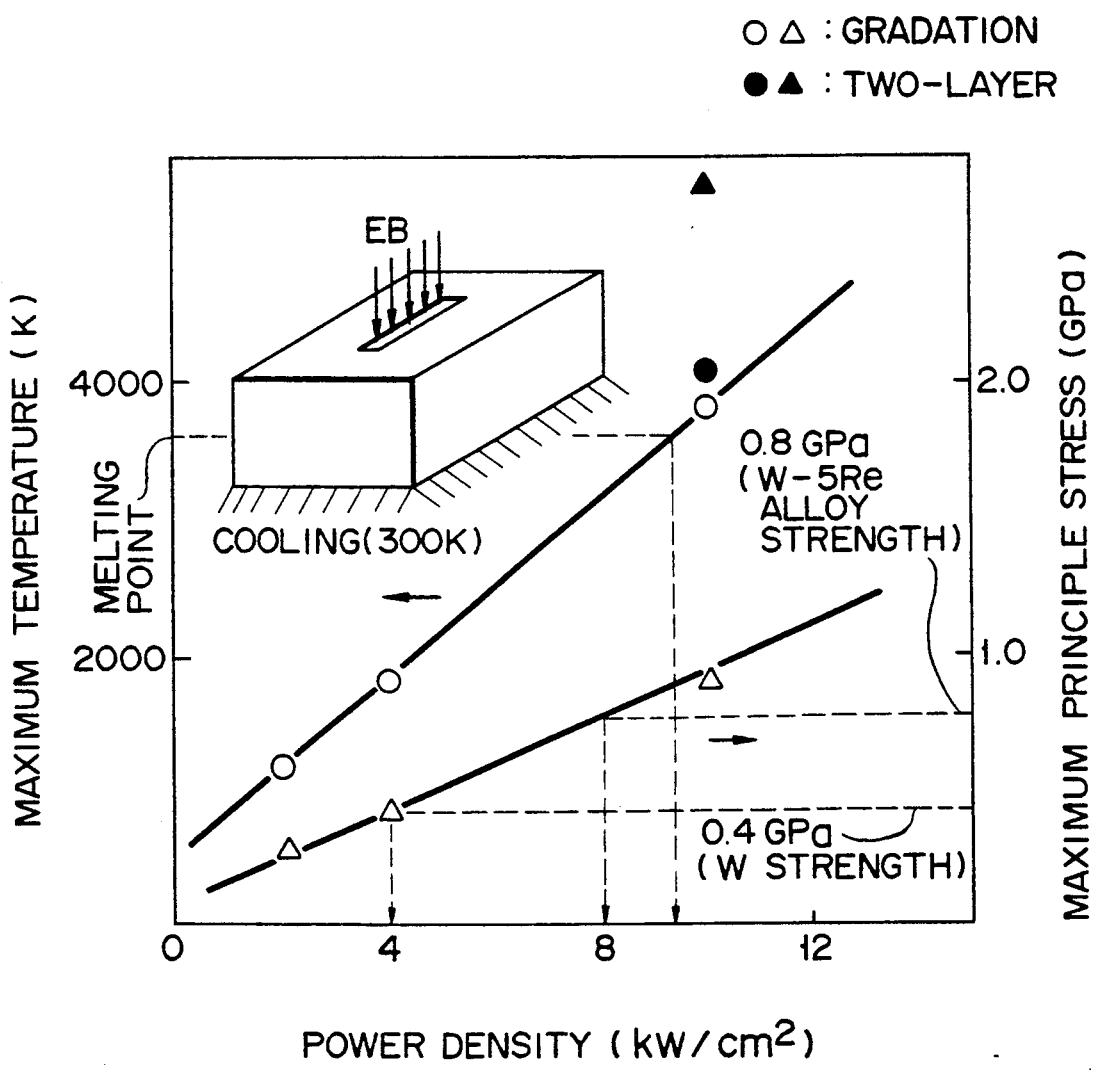
FIG. 14 is a diagram for showing the relation of the input heat density of electron beam, maximum principal stress and maximum reaching temperature when electron beam is emitted to the electron beam target in FIG. 11.

Incidentally, since the beam target 121 is heightened in strength by alloying W, the EB input until breakdown may be increased. FIG. 14 shows the EB input heat density, generated maximum thermal stress, and maximum reaching temperature as analyzed by finite element method. As shown in FIG. 13, the maximum thermal stress is generated in the W alloy layer immediately beneath the heat source, and since the degree of lowering of strength of each part does not seem to be so great owing to compounding with Cu, the breakdown of beam target 121 is considered to be induced when the stress generated in the alloy layer becomes larger than its strength.

The dot-dash lines shown in FIGS. 13A to 13D are central lines of distribution diagrams. Only the right half of each distribution diagram is, hence, illustrated, since the left half is symmetrical to the right half.

Here, on the basis of the result of measurement of strength of W or W alloy at ordinary temperature, it is estimated how much the input heat can be increased by alloying. In the case of pure W, the strength is about 0.4 GPA, and the maximum applicable input heat density is about 4 kW/cm$^2$ at most, but in the case of W-5Re alloy adding 5% Re, the strength is increased about twice to 0.8 GPa, so that an EB input of about 8 kW/cm$^2$ is possible. Furthermore, when the input heat density is 9 kW/cm$^2$ the maximum reaching temperature exceeds the melting point of W alloy, and it is meaningless if the Re content is increased to raise the strength, which is the application limit for the beam target 121.

In the third and fourth embodiments described so far, the beam target 121, especially linear EB heating, is mentioned, but it may be also applied to all other high temperature equipment parts requiring heat resistance and thermal conductivity, and the beam form is not limited to EB, but it may be applied to all heat sources.

Figure 15:
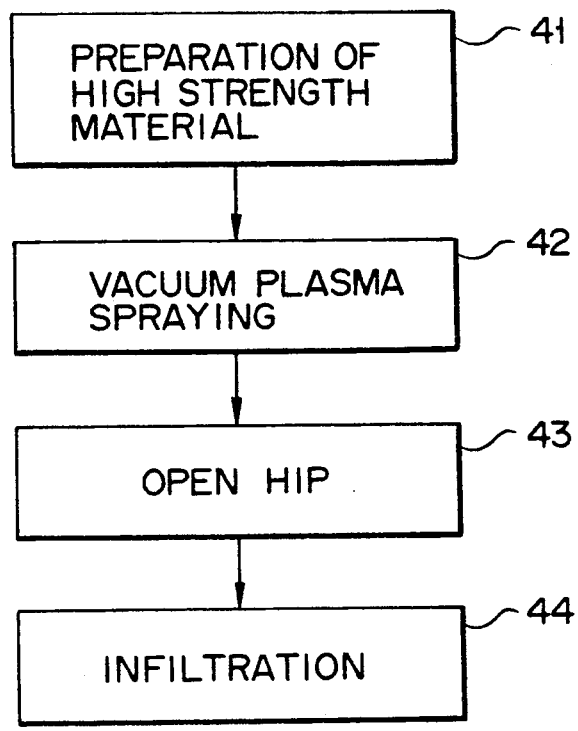
FIG. 15 is a process chart showing a fifth embodiment of fabricating method of composite material of the invention.
Figure 16:
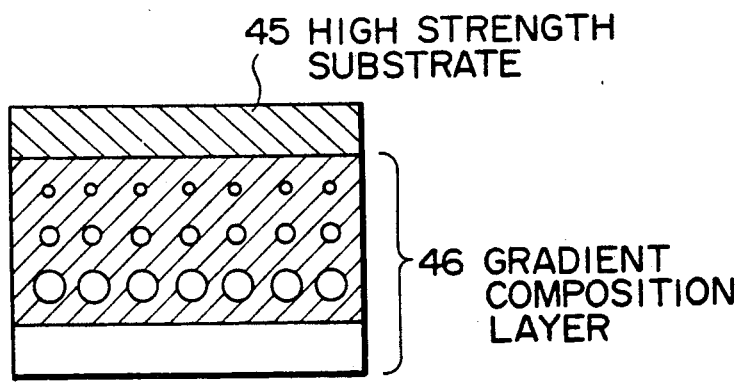
FIG. 16 is an approximate sectional view of the material obtained in the fifth embodiment.

The fifth embodiment is described below by reference to FIGS. 15, 16. The fabricating method of the fifth embodiment comprises the first step 41 through fourth step 44. At the first step 41, a high strength substrate 45 is prepared by rolling, forging or other plastic processing. At the second step 42, the high strength substrate 45 fabricated in the first step 41 is sprayed by a known vacuum plasma spraying apparatus as mentioned below, on the heating surface in the case of EB irradiated beam target, or a material producing a large stress locally, and the sprayed film with gradient porosity is made of two materials. At the third step 43, the material obtained in the second step 42 is applied to a capsule-free HIP (hot isostatic pressing) device to remove the closed pores (defects) which may initiate breakdown. At the fourth step 44, by infiltrating the second material into the open pores existing in the material obtained in the third step 43, a composite material having a gradient composition layer 46 is completed as shown in FIG. 16.

The vacuum plasma spraying (VPS) apparatus is briefly described below. A high pressure container is filled with inert gas reduced to about tens to hundreds of Torr, and the work to be sprayed is put in this atmosphere, and the powder from the powder feeder is sprayed therein together with the plasma from the plasma control unit.

The capsule-free HIP (open HIP) is a process of conducting hot isostatic pressing on the material not contained in a capsule, and is different from the ordinary HIP in which no pressure is applied to the inner part of the material which is contained in a capsule which collapses at high temperatures.

Thus obtained composite material using the high strength substrate 45 manufactured by plastic processing, and the mechanical strength can be reinforced. Besides, since the porosity by spraying method depends greatly on the particle size of the powder to be used, in other words, a spray film with gradient porosity is formed only by varying the particle size of the powder to be used. Still more, since the vacuum plasma spraying method is to spray in a reduced inert atmosphere of about tens to hundreds of Torr, it is possible to form a film less in oxide coating, strong in bonding force among particles, and tight in contact with the high strength substrate. Besides, by a capsule-free HIP, it is possible to eliminate causes of increase of thermal resistance, or closed pores where stress is concentrated. In this case, by performing infiltration at ordinary pressure or high pressure with inert gas or in reducing atmosphere, the open pores may be filled up with the second material.

Thus, according to the fifth embodiment, cracks and other defects in electron beam heating may be reduced, while the input heat density may be increased.

Reference is then made to FIGS. 17, 10 to explain the sixth embodiment of the invention. As shown in the process chart in FIG. 17, this method comprises the first step 51 through the fifth step 55. At the first step 51, substrate surface is cleaned at the first step. At the second step 52, the substrate cleaned in the first step 51 and the same material are sprayed, for example by vacuum plasma spraying, to slope the composition continuously. At the third step 53, by the open HIP, leaving the open pores (communicating with outside) formed in the second step 52, the closed pores (not communicating with outside) are destroyed. At the fourth step 54, a low melting metal, for example, Cu is infiltrated into the pores obtained in the third step 53. The fifth step 55 is for machining.

The sixth embodiment brings about the following effects. Since the vacuum plasma spraying in the second step 52 is to spray in an inert gas atmosphere at tens of Torr, the material is not oxidized. By using powder material or large particle size for spraying, the internal unmolten particles drift and deposit, and a film of a relatively large porosity may be formed.

Furthermore, in the open HIP treatment in the third step 53, the closed pores can be eliminated while leaving the open pores formed by vacuum plasma spraying in the second step 52. By infiltrating the low melting material Cu into the material W possessing only open pores and having gradient pores obtained in this way, it is possible to spray in a relatively wide area, and a large and continuous gradient material may be fabricated.

Accordingly, also on the three-dimensional curved surface which was difficult to obtain in the first embodiment, a gradient structure may be formed, and the gradient is continuous, while it was stepwise in the first embodiment, so that the thermal stress may be alleviated furthermore. Consequently, the thermal stress alleviation on the interface of different material such as coating and joint may function effectively, so that the heat cycle characteristic and heat resistance may be improved.

As the substrate in the sixth embodiment, any one of W, Mo, Ta, Nb, Re, V, $ZrO_2$, MgO, $Al_2O_3$, $Y_2O_3$, SiC, $Si_3N_4$, Bn, AlN may be used, and the low melting material may be selected from Cu, Ag, Fe, Ni, Co or their alloys.

The vacuum plasma spraying in the sixth embodiment is not limitative, but as far as the material is excellent in oxidation resistance, any atmospheric spraying method such as plasma spraying, gas spraying and the arc spraying method may be applied, and same effects will be obtained.

Figure 18:
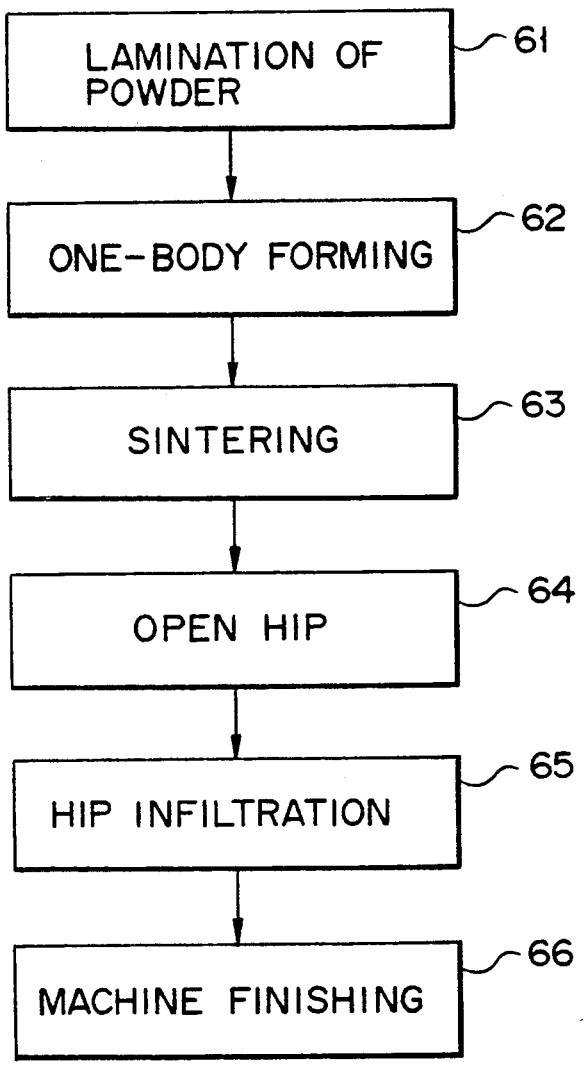
FIG. 18 is a process chart showing a seventh embodiment of fabricating method of composite material of the invention.

The seventh embodiment is explained by reference to the process chart in FIG. 18. This embodiment is characterized by the HIP infiltration to treat at high pressure, when infiltrating the second material into the pores of the first material in the fourth step of the first embodiment. That is, after obtaining the sintered body in the third step 63, infiltration by open HIP is conducted at the fourth step 64, and then HIP infiltration is carried out at the fifth step 65.

For example, in order that a fluid with a surface tension $\delta$ enters in a circular pore with radius r, supposing the contact angle to be $\theta$, the pressure P must satisfy the following relation.

$$P \geq (2\delta \cos \theta) \div r$$

Therefore, once the material system is determined, $\theta$ and $\delta$ are automatically decided, and if desired to permeate liquid into tiny holes, the pressure P must be increased. In other words, when pressure p is applied more, liquid can penetrate into smaller holes.

Hence, by infiltrating by means of HIP apparatus capable of creating high temperature, high pressure field, the second material can be securely infiltrated into open pores. As the type of gas, meanwhile, when inert gas such as Ar and He is used, the problem of oxidation of material may be eliminated.

On the other hand, when the temperature is raised, generally, the contact angle $\theta$ becomes smaller. In consequence, cos $\theta$ becomes smaller, and therefore provided the pressure P be constant, the radius r may be reduced, but it gives rise to the problem of material reaction.

Accordingly, by HIP infiltration in high pressure field, open pores are not left over, and it is possible to fabricate a gradient material with small reaction between materials. As the pores are eliminated, the mechanical strength is enhanced, and the thermal conductivity is improved.

In the seventh embodiment, in order to reduce the contact angle $\theta$, an active element may be added in the liquid to promote infiltration into the fine pores.

Referring then to FIGS. 19, 20, the fabricating method of heat conductive material by the invention, and the heat conductive material obtained by this method (hereinafter called the eighth embodiment) are explained. FIG. 19 is a process chart for explaining the fabricating method, and at the first step 71, the dope rolled material is fabricated to make the heat receiving side with single crystals of W, Mo. At the step 72, the surface of the rolled material obtained in the first step 71 is roughened by blasting or the like, and W powder is laminated in gradient. At the third step 73, sintering and bonding the W rolled material and W powder obtained in the second step 74, in which, simultaneously with the third step 73, by making use of secondary recrystallization, the minimum surface doped W, Mo rolled materials of W, Mo are grown into giant crystal grains to prepare a skeleton of W or Mo. In this case, the heat receiving side is the single crystal. Later, at the fifth step 75, Cu is infiltrated into the pores sloped at the fourth step 74, and it is machined and finished at the sixth step 76.

The heat receiving material 77 made in such process is shown in FIG. 20. In this case, the large thermal stress receiving unstationarily is borne by the single crystal W Or Mo excelling in ductility on the heat receiving surface 78, while the stationary thermal stress is alleviated by the W/Cu gradient composition beneath it. By eliminating the grain boundary of W and Mo where grain boundary brittleness is likely to occur, a heat receiving material having W, Mo extremely excellent in ductility disposed at the heating side is obtained. Aside from superior heating performance, the thermal impact property by quick heating is improved.

This embodiment for manufacturing the heat receiving material also avoids the following points. That is, in fabrication of sintered body of W, Mo and giant crystal grain growth, sintering of W, Mo powder is sometimes promoted too much, and a porosity gradient region may not be fabricated sufficiently. Accordingly, in this embodiment, by using particles of about 10 microns, this problem is avoided. Besides, by vacuum plasma spraying, it is possible to form a gradient region 80 of W, Mo on the rear side of the single crystal plate. Moreover, by executing the giant crystal growth in the first place, the powder may be laminated in gradient on the surface of the single crystal material, and then the sintered bond Cu is infiltrated, so that a similar heat receiving plate may be manufactured.

In the eighth embodiment for fabricating the heat receiving material 77, the heat receiving side 78 is W, or Mo, but this heat receiving side may be also made of Re or V, or an alloy mainly comprising W, Mo, Re or V. Besides, on the opposite side of the heat receiving side 78 in FIG. 20 (for example, the water cooling surface) 79, a high thermal conductive material such as Cu, Ag, Fe or their alloy may be formed, and the composition may be sloped from the heat receiving side 78 to the opposite side.

In the foregoing embodiments. when forming pores in the high melting material or low melting material, either sintering method or vacuum plasma spraying method is employed, but it may be also possible to employ other methods, including chemical deposition method and physical deposition method.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of fabricating a composite material composed of a high-melting material and low-melting material, said method comprising:

a first step of forming pores in said high melting material to obtain a substrate material having a porosity distribution, with the porosity gradually decreasing from a region defined in the high-melting material toward a further region; and a second step of infiltrating said low-melting material into said pores of said substrate material to obtain a gradient material having a gradient distribution of a composite ratio of said high-melting material and low-melting material.

2. A fabricating method according to claim 1, wherein said first step of forming pores in said high-melting material is one selected from the group consisting of a sintering method, a vacuum plasma spraying method, a chemical deposition method and a physical deposition method.

3. A fabricating method according to claim 1, wherein said first step of obtaining said substrate material having said porosity distribution, with the gradually decreasing porosity, further comprises:

(a) a sub-step of grinding said high-melting material and an element miscible with said high-melting material in a solid solution state during molding so as to constitute a raw material, into powder, and mixing the powder of said high-melting material and the powder of said element with each other to prepare a mixture thereof;

(b) a sub-step of molding said mixture prepared in said sub-step (a) to form a molded member; and (c) a sub-step of sintering said molded member obtained in said sub-step (b) for solid-solution reinforcement thereof.

4. A fabricating method according to claim 1, wherein said first step of obtaining said substrate material having said porosity distribution, with the gradually decreasing porosity, further comprises:

(d) a sub-step of grinding said high-melting material and one selected from the group consisting of a plurality of types of compound materials having a property of being dispersed without reacting with said high-melting material during molding, into powder, and mixing the powder of said high-melting material and the powder of said selected one, to obtain a mixture;

(e) a sub-step of molding said mixture obtained in said sub-step (d) to make a molded member; and (f) a sub-step of sintering said molded member obtained in said sub-step (e) for dispersion-reinforcement thereof.

5. A method of fabricating a composite material composed of a high-melting material and low-melting material, said method comprising:

a first step of preparing a reinforced member by mechanically reinforcing said high-melting material by a method selected from the group consisting of a rolling method, a forging method, and an alloying method;

a second step of forming pores in said reinforced member obtained in said first step by spraying a common material thereto by vacuum-plasma spraying means to obtain a substrate material having a porosity distribution, with the porosity gradually decreasing from a region defined in the high-melting material to a further region; and a third step of infiltrating said low-melting material in a molten state into said pores of said substrate material obtained in said second step to obtain a gradient material having a gradient distribution of a composite ratio of said high-melting material and low-melting material.

6. A fabricating method according to claim 5, wherein said second step of forming said pores can be achieved by spraying a material similar to said reinforced member by spraying means.

7. A fabricating method according to claim 5, wherein said second step comprises:

(g) a sub-step of treating said reinforced member obtained in said first step by spraying a material similar to that of said reinforced member thereto by spraying means so as to prepare the substrate material having pores; and (h) a sub-step of treating said substrate material obtained in said sub-step (e) by hot isostatic pressing.

8. A fabricating method according to claim 7, wherein said hot isostatic pressing treatment is a capsule-free method in which said substrate is treated without being put in a capsule.

9. A method of fabricating a heat receiving material composed of a high heat conductive material and a low heat conductive material, said method comprising:

a first step of forming a laminate of a substrate material selected from the group consisting of a dope-added press-rolled material and forged material as the low heat conductive material, and powder of the same kind as said substrate material, said powder being accumulated on one side of said selected substrate material;

a second step of preparing, by sintering said laminate, a sintered material having pores formed at a porosity distribution, with the porosity gradually decreasing from a region defined in the laminate obtained in said first step, toward a further region; and a third step of infiltrating said high heat conductive material into pores of said sintered material to form a member having a gradient distribution of a composite ratio of said low heat conductive material and high heat conductive material.

10. A fabricating method according to claim 9, wherein one side of said selected substrate material is covered with said powder by vacuum plasma spraying.

* * * * *

UNITED STATES PATENT AND TRADEMARK OFFICE
CERTIFICATE OF CORRECTION

PATENT NO. : 5,126,102

DATED : June 30, 1992

INVENTOR(S) : Masashi Takahashi et al.

It is certified that error appears in the above-identified patent and that said Letters Patent is hereby corrected as shown below:

On the title page: Item [30]:
The second priority data has been omitted, should be, --Feb. 28, 1991 [JP] Japan..........................3-059545--.

Signed and Sealed this

Tenth Day of August, 1993

Attest:

MICHAEL K. KIRK

*Attesting Officer*   *Acting Commissioner of Patents and Trademarks*